(12) United States Patent
Ozaki

(10) Patent No.: US 11,456,612 B2
(45) Date of Patent: Sep. 27, 2022

(54) MOBILE CHARGING APPARATUS AND CHARGING SYSTEM

(71) Applicant: OMRON Corporation, Kyoto (JP)

(72) Inventor: Mayumi Ozaki, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 13 days.

(21) Appl. No.: 17/170,945

(22) Filed: Feb. 9, 2021

(65) Prior Publication Data
US 2021/0281098 A1 Sep. 9, 2021

(30) Foreign Application Priority Data

Mar. 6, 2020 (JP) .............................. JP2020-038941

(51) Int. Cl.
*H02J 7/02* (2016.01)
*A47L 9/28* (2006.01)
*A47L 11/40* (2006.01)

(52) U.S. Cl.
CPC .............. *H02J 7/02* (2013.01); *A47L 9/2873* (2013.01); *A47L 11/4005* (2013.01); *A47L 2201/022* (2013.01)

(58) Field of Classification Search
CPC ................................ H02J 7/02; A47L 9/2873
USPC ....................................................... 320/108
See application file for complete search history.

(56) References Cited

U.S. PATENT DOCUMENTS

| | | | | |
|---|---|---|---|---|
| 2019/0135125 | A1* | 5/2019 | Sponheimer | B60L 58/30 |
| 2020/0031239 | A1* | 1/2020 | Chae | B60L 53/65 |
| 2020/0238843 | A1* | 7/2020 | Harvey | H02J 1/08 |
| 2020/0361329 | A1* | 11/2020 | Schütz | B60L 53/57 |
| 2021/0129697 | A1* | 5/2021 | Cho | B60L 53/38 |

FOREIGN PATENT DOCUMENTS

| | | |
|---|---|---|
| CN | 110040017 A | 7/2019 |
| JP | 2006-231448 A | 9/2006 |
| KR | 102014333 B1 | 8/2019 |

OTHER PUBLICATIONS

Extended European search report (EESR) dated Aug. 2, 2021 in a counterpart European patent application.

* cited by examiner

Primary Examiner — Suchin Parihar
(74) Attorney, Agent, or Firm — Metrolex IP Law Group, PLLC

(57) ABSTRACT

A charge support vehicle according to one or more embodiments may be capable of charging a battery of a travel robot without interrupting traveling, and a charging system. A charge support vehicle according to one or more embodiments may track a cleaning robot based on positional information of the cleaning robot, and may be docked to the cleaning robot in a state of traveling, thereby charging a battery of the cleaning robot while traveling.

14 Claims, 12 Drawing Sheets

MOBILE CHARGING APPARATUS AND CHARGING SYSTEM

CROSS-REFERENCES TO RELATED APPLICATIONS

This application claims priority to Japanese Patent Application No. 2020-038941 filed Mar. 6, 2020, the entire contents of which are incorporated herein by reference.

FIELD

The disclosure relates to a mobile charging apparatus that is capable of autonomously traveling and charges a battery of an electrically-powered travel object, and a charging system.

BACKGROUND

Conventionally, a type of travel robot (electrically-powered travel object) that autonomously travels with a battery is known. For example, functional robots have been put to practical use, such as a cleaning robot that cleans a surface to be cleaned, e.g., a floor surface, while autonomously traveling, a delivery robot that delivers packets and the like in a facility such as a factory, and a security robot that keeps guard while traveling in a facility at night. Conventional travel robots are driven by electric power fed from a built-in battery. Accordingly, when the residual amount (amount of stored power) of the battery is reduced, the battery needs to be charged.

A charging station provided with a charging apparatus that charges the battery of such a travel robot is known (see JP 2006-231448A). For example, the travel robot disclosed in JP 2006-231448A automatically moves to the charging station when the residual amount of the battery is low, and automatically connects to a power-feeding terminal of the charging station to charge the battery.

JP 2006-231448A is an example of background art.

SUMMARY

However, the conventional charging method is such that when the residual amount of the battery of the travel robot is low, the travel robot interrupts the operation of the primary purpose, and returns to the charging station, where the travel robot is fed with power. Accordingly, since the travel robot has to return to the charging station to charge, the returning time, charging time, and additional returning time for returning to the position in which the operation is interrupted after completion of the charging are wasted, and the primary operation cannot be performed during that time, resulting in poor work efficiency.

A mobile charging apparatus according to one or more embodiments may be capable of charging a battery of an electrically-powered travel object without interrupting the travel of the travel object, and a charging system.

(1) According to one or more embodiments, a mobile charging apparatus is configured to travel autonomously, and charge a battery of an electrically-powered travel object. The mobile charging apparatus may include: a vehicle body equipped with a power-feeding battery, wherein when a battery feed request to feed the battery of the electrically-powered travel object that is traveling is received, the mobile charging apparatus is configured to: start traveling from a predetermined standby position while searching for the electrically-powered travel object; approach, when the electrically-powered travel object is found, the electrically-powered travel object according to a feeding position in which power feeding is possible from the power-feeding battery to the battery of the electrically-powered travel object, and keep the vehicle body in the feeding position; and feed power from the power-feeding battery to the battery of the electrically-powered travel object in the feeding position.

With the above-described configuration, the mobile charging apparatus may charge the electrically-powered travel object that is traveling. Accordingly, the electrically-powered travel object may continue to travel without interrupting the travel.

(2) The mobile charging apparatus according to one or more embodiments may further include: a first control unit configured to track the electrically-powered travel object based on position specifying information for specifying a position of the electrically-powered travel object; a distance detection unit configured to detect a distance between the electrically-powered travel object and the vehicle body by outputting measurement light forward; a second control unit configured to keep the vehicle body in the feeding position if it is determined that the vehicle body is located in the feeding position based on a result of the detection by the distance detection unit; and a third control unit configured to start feeding power from the power-feeding battery to the battery of the electrically-powered travel object in the feeding position.

With above-described configuration, it may be possible to specifically realize charging of the battery of the electrically-powered travel object that is traveling.

(3) In the mobile charging apparatus according to one or more embodiments, the second control unit may control travel of the vehicle body so that the vehicle body is kept in the feeding position while the electrically-powered travel object travels.

With above-described configuration, stable charging may be possible in the feeding position.

(4) In the mobile charging apparatus according to one or more embodiments, the first control unit may track the electrically-powered travel object based on positional information of the electrically-powered travel object that is received as the position specifying information, together with the battery feed request, from the electrically-powered travel object.

With above-described configuration, the mobile charging apparatus may reach the position of the electrically-powered travel object correctly and rapidly, making it possible to promptly charge the battery.

(5) In the mobile charging apparatus according to one or more embodiments, the vehicle body may include a power-feeding connection part connected to the power-feeding battery. Also, the electrically-powered travel object may include a power-receiving connection part connected to the battery of the electrically-powered travel object. In above-described case, the feeding position may be a position in which the power-feeding connection part and the power-receiving connection part may be electrically connected to each other.

(6) In the mobile charging apparatus according to one or more embodiments, the vehicle body may include a wireless power-feeding part connected to the power-feeding battery. Also, the electrically-powered travel object may include a wireless power-receiving part connected to the battery of the electrically-powered travel object. In above-described case, the feeding position may be a position in which charging is possible from the wireless power-feeding part to the wireless power-receiving part by a noncontact charging method.

(7) According to one or more embodiments, a charging system may be such that a battery of an electrically-powered travel object is charged from a mobile charging apparatus equipped with a power-feeding battery, the mobile charging apparatus being configured to travel autonomously. In the charging system, the electrically-powered travel object may include a request transmission unit configured to transmit a battery feed request when a residual amount of the battery of the electrically-powered travel object is less than a predetermined threshold. Also, the mobile charging apparatus may include: a first control unit configured to track the electrically-powered travel object based on position specifying information for specifying a position of the electrically-powered travel object; a distance detection unit configured to detect a distance between the electrically-powered travel object and the mobile charging apparatus by outputting measurement light forward; a second control unit configured to, in response to mobile charging apparatus being located in a feeding position in which power feeding is possible from the power-feeding battery to the battery of the electrically-powered travel object based on a result of the detection by the distance detection unit, keep the mobile charging apparatus in the feeding position; and a third control unit configured to start feeding power from the power-feeding battery to the battery of the electrically-powered travel object in the feeding position.

According to one or more embodiments, it may be possible to charge the battery of a travel robot without interrupting the travel thereof.

DETAILED DESCRIPTION

Hereinafter, one or more embodiments are described with reference to the accompanying drawings. Note that the one or more embodiments described below are example embodiments and do no restrict the technical scope of the invention.

Charging System 100

Figure 1:
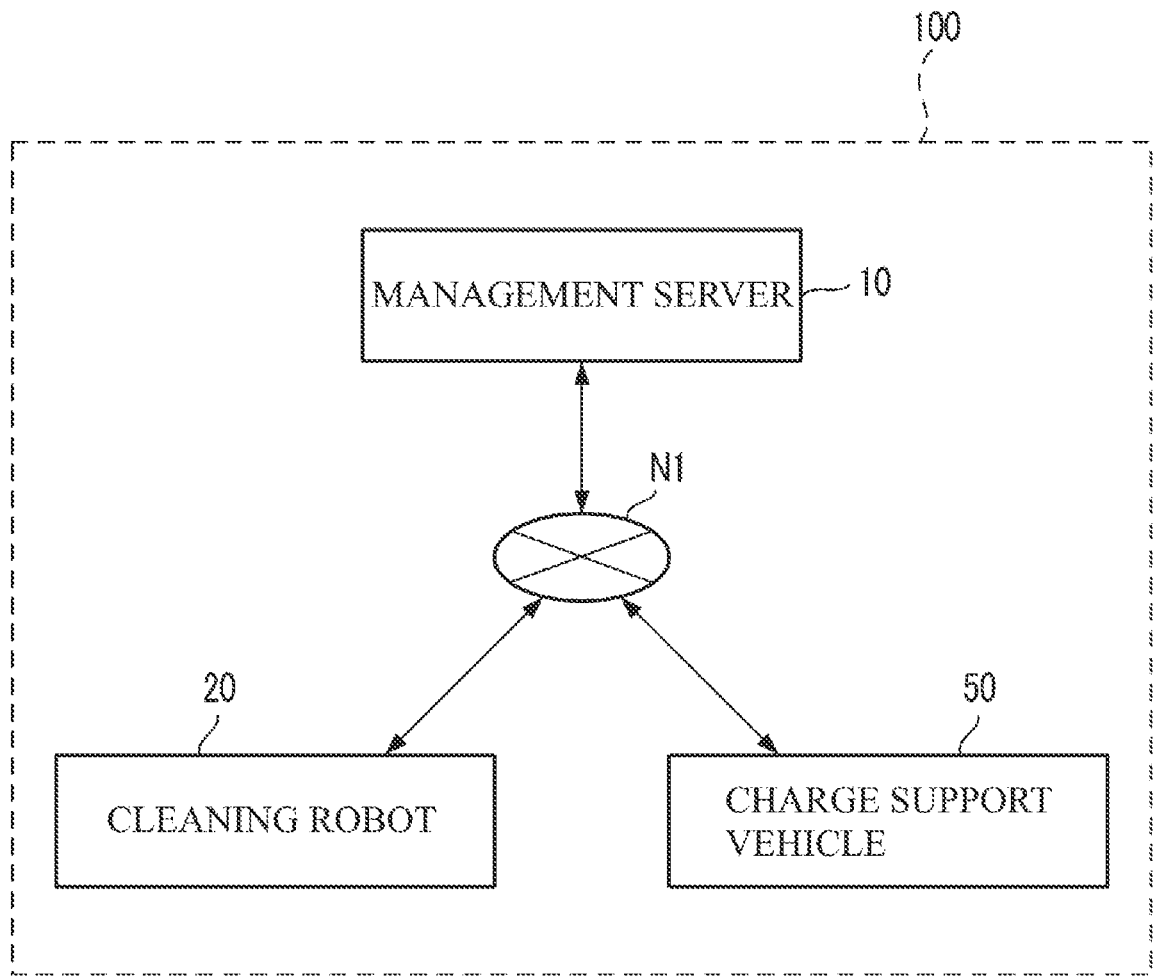
FIG. 1 is a diagram illustrating a configuration of a charging system according to one or more embodiments.

As shown in FIG. 1, a charging system 100, which is an example of a charging system according to one or more embodiments includes a management server 10, a cleaning robot 20 (an example of an electrically-powered travel object), and a charge support vehicle 50 (an example of a mobile charging apparatus) for charging the cleaning robot 20. The charging system 100 is employed in, for example, a facility in which the cleaning robot 20 performs cleaning operations.

The cleaning robot 20 is an autonomous travel-type cleaning apparatus (autonomous travel apparatus) that autonomously travels and moves over the floor surface of a concourse in a facility such as an airport, a station, and a shopping mall, and may also be referred to as a mobile robot. The cleaning robot 20 includes a battery 24 (see FIG. 3), and is driven by electric power of the battery 24. The cleaning robot 20 is an object (charging target) to be charged by the charge support vehicle 50.

Figure 4:
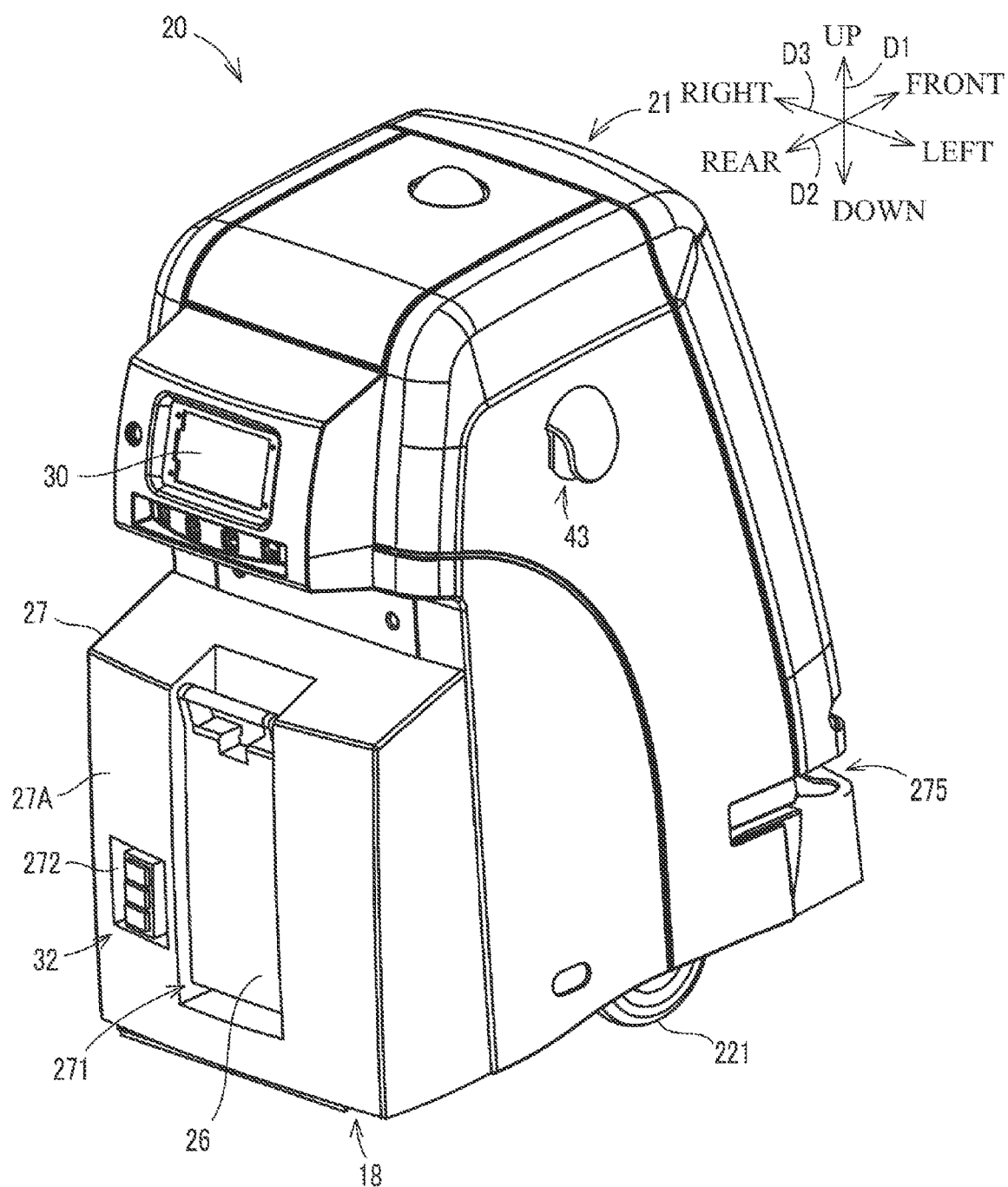
FIG. 4 is a diagram illustrating a perspective view of an outer appearance on a rear side of a cleaning robot according to one or more embodiments.

While moving forward by autonomously traveling on the floor surface, the cleaning robot 20 sucks up waste and so on such as rubbish and dust on the floor surface, separates the waste and so on using a filter, and collects the separated waste in a collection box 26 (see FIG. 4). The cleaning robot 20 automatically performs cleaning while traveling forward over the floor surface based on various kinds of cleaning information input in advance, such as a travel route, a cleaning area map, a cleaning time zone (time schedule), and a return position to which the cleaning robot 20 returns to charge. The cleaning robot 20 is, of course, not limited to one that travels along the travel route, one or more embodiments may apply to, for example, a cleaning robot that travels the cleaning area while avoiding obstacles by analyzing a video captured by a camera 49 provided on its front surface.

Note that one cleaning robot 20 or a plurality of cleaning robots 20 may be provided in a facility. FIG. 1 shows one cleaning robot 20 as an example. Also, when a plurality of electrically-powered travel objects are provided in a facility, not all of the plurality of electrically-powered travel objects need to be cleaning robots 20, but need only to be at least charging targets of the charge support vehicle 50. Thus, the plurality of electrically-powered travel objects may have different functions.

Also, the cleaning robot 20 is merely an example of the electrically-powered travel object, one or more embodiments may also apply to, for example, a cleaning apparatus that cleans an indoor floor surface, but may also be applied to a cleaning apparatus that cleans a path surface of an outdoor footpath, a road, and the like while traveling autonomously. Alternative examples of the electrically-powered travel object include autonomous travel apparatuses, for example, autonomous travel-type mobile robots that do not have a cleaning function but realize other usages and functions, such as a security robot capable of autonomously traveling, a nursing-care robot, a delivery robot that delivers packets, and a guide robot that travels while announcing various kinds of information.

The management server 10 is arranged in, for example, a management room, an office, or the like of the facility in which the cleaning robot 20 operates. The management server 10 manages information relating to a cleaning area in which the cleaning robot 20 operates, a travel route on the cleaning area map, and the like, and further manages information relating to a cleaning operation process of the cleaning robot 20, a time schedule of the cleaning operation, an action history including actions executed by the cleaning robot 20, a charging history of the battery 24 of the cleaning robot 20, cleaning time spent cleaning the cleaning area, and the like by storing it into a storage device (not shown).

The management server 10 also functions as a relay server that relays transmission and reception of information and signals between the cleaning robot 20 and the charge support vehicle 50. The management server 10 is capable of communicating with the cleaning robot 20 and the charge support vehicle 50 via a communication network N1 such as a wired LAN or a wireless LAN that is installed in the facility.

The management server 10 is a server device such as, for example, a personal computer. The management server 10 is provided with a control unit 11 (see FIG. 7) including control instruments such as a CPU, a ROM, and a RAM, and the control unit 11 executes relay processing for relaying information and signals between the cleaning robot 20 and the charge support vehicle 50. Note that the management server 10 is not necessarily installed in the facility, but may be, for example, a server device that is installed outside the facility via the communication network N1 or another communication network, or may be a cloud server. Also, the management server 10 is not limited to a server device, but may be an information processing device such as a tablet terminal, for example.

Note that in the present embodiment, an example of processing in which the management server 10 executes the relay processing is given, one or more embodiments may apply to an example of processing in which, for example, the cleaning robot 20 and the charge support vehicle 50 directly communicate with each other to transmit and receive information and signals.

The charge support vehicle 50 is configured to charge the battery 24 (see FIG. 3) installed in the cleaning robot 20, and is an autonomous travel apparatus capable of autonomously traveling. The charge support vehicle 50 is arranged in the facility in which the cleaning robot 20 is employed, and moves by autonomously traveling over the floor surface in the facility. The charge support vehicle 50 includes a high-capacity battery 52 (see FIG. 5). The battery 52 stores electric power for charging the cleaning robot 20, and for driving a motor 55 (see FIG. 7) that drives the charge support vehicle 50.

Meanwhile, a conventional method for charging the cleaning robot 20 is such that when the residual amount of the battery 24 of the cleaning robot 20 is low, the cleaning robot 20 interrupts the cleaning operation, and returns to the charging station for charging the cleaning robot 20, and the cleaning robot 20 is fed with power in the charging station. Accordingly, since the cleaning robot 20 has to return to the charging station to charge, the returning time, charging time, and additional returning time for returning to the position in which the operation is interrupted after completion of the charging are wasted, and the cleaning operation cannot be performed during that time.

In contrast, the charge support vehicle 50 of the present embodiment is configured to track the cleaning robot 20 based on positional information of the cleaning robot 20, and can be docked to the cleaning robot 20 in a traveling state, thereby making it possible to charge the battery 24 of the cleaning robot 20 while traveling. Therefore, the cleaning robot 20 no longer needs to interrupt the cleaning operation, resulting in an improvement in the work efficiency of the cleaning operation. Hereinafter, configurations of the cleaning robot 20 and the charge support vehicle 50 are described in detail.

Cleaning Robot 20

Figure 2:
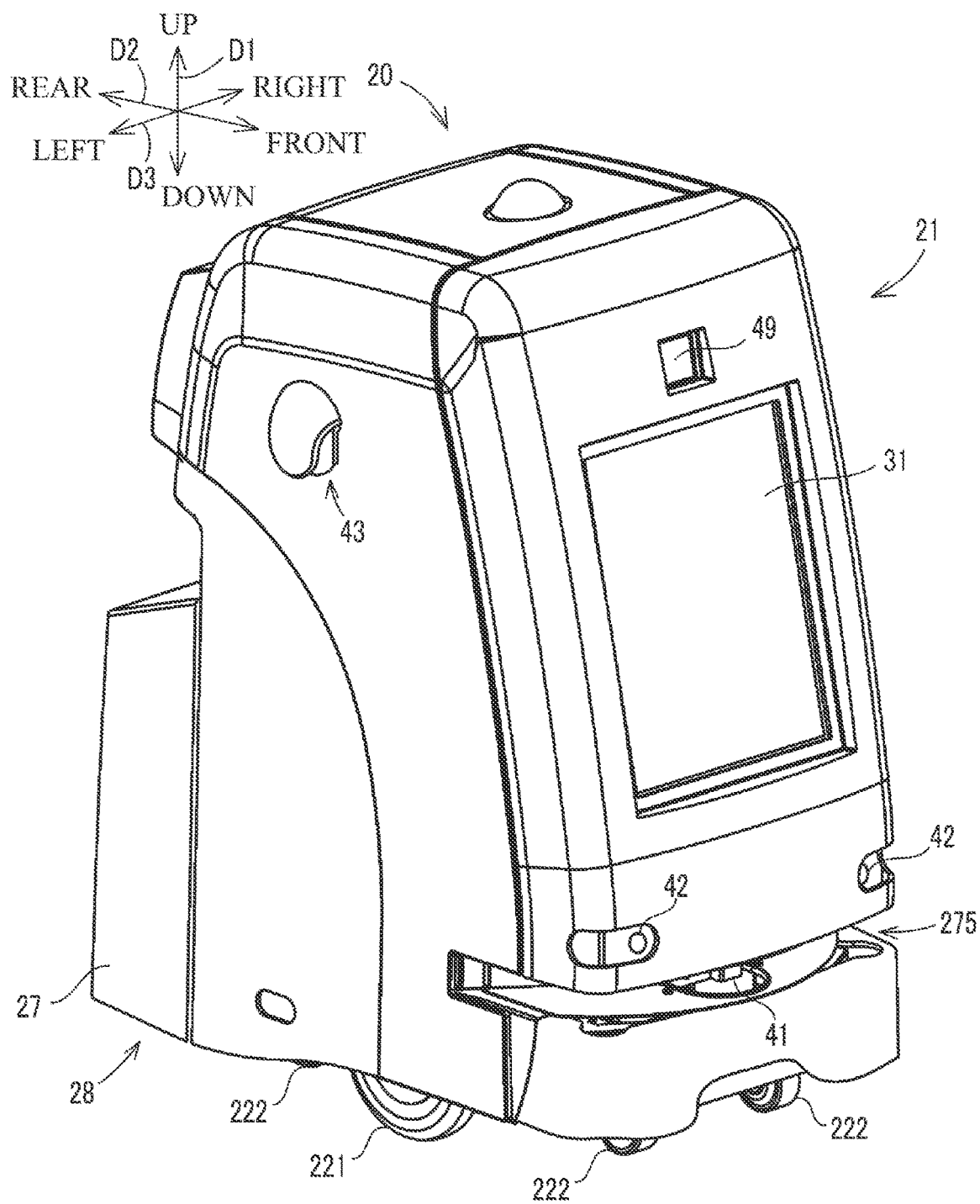
FIG. 2 is a diagram illustrating a perspective view of an outer appearance on a front side of a cleaning robot according to one or more embodiments.
Figure 3:
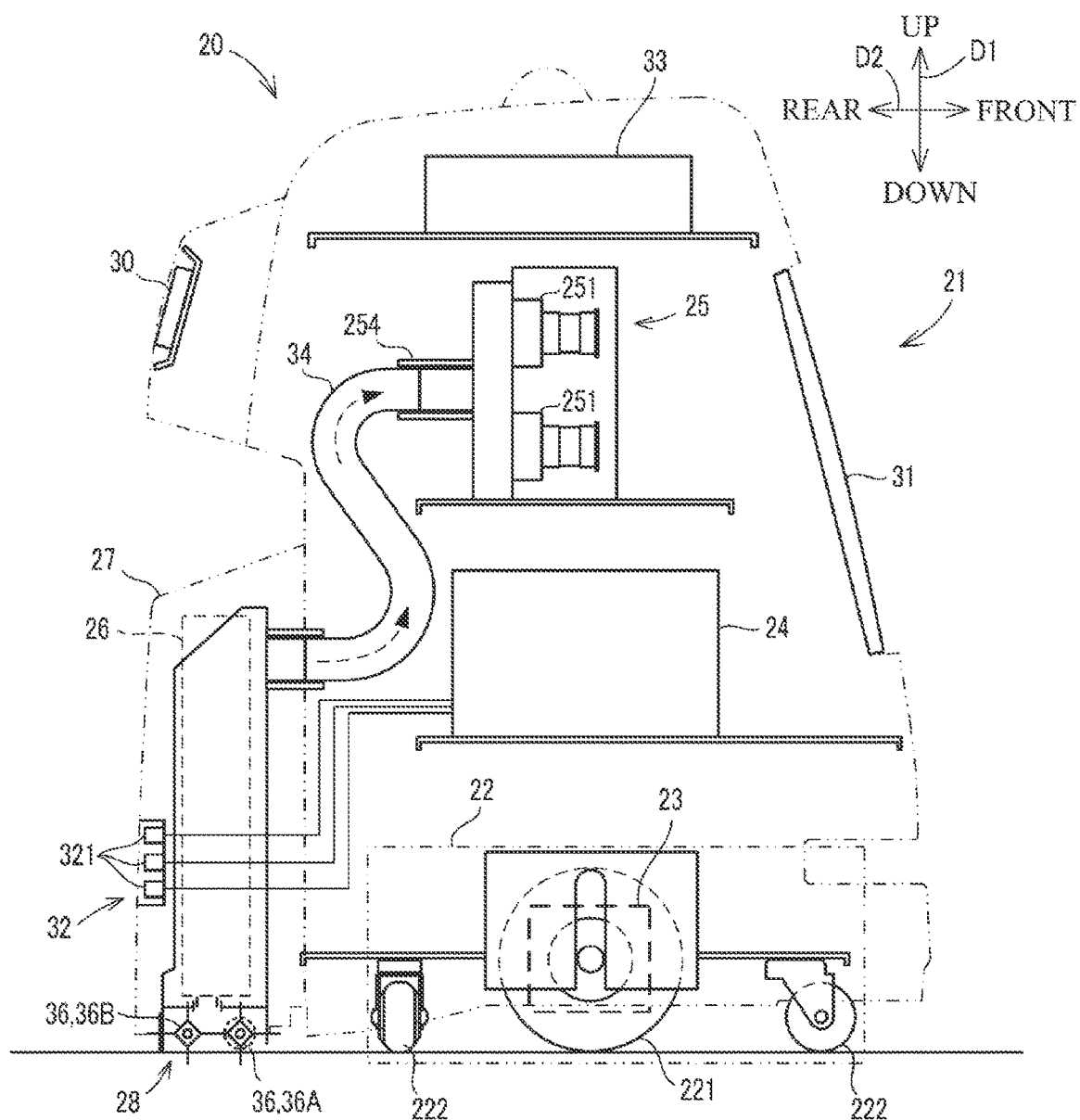
FIG. 3 is a diagram illustrating a schematic view of an internal configuration of a cleaning robot according to one or more embodiments.

FIG. 2 is a diagram illustrating a perspective view of an outer appearance on the front side of the autonomous travel-type cleaning robot 20 according to the embodiment, and FIG. 3 is a diagram illustrating a schematic view of the inner structure of the cleaning robot 20. In the following description, an up-down direction D1, a front-rear direction D2, and a left-right direction D3 that are shown in the drawings are used.

As shown in FIG. 4, the cleaning robot 20 includes a body part 21 and functional units provided on the body part 21. Specifically, the body part 21 includes a traveling part 22, a motor 23, a battery 24, an air intake unit 25, a collection box 26, a support holder 27, an air intake nozzle 28, an operation unit 30, a display panel 31, a charging connection part 32 (an example of a power-receiving connection part), a control unit 33, and the like. The cleaning robot 20 further includes a front laser sensor 41, sonar sensors 42, side laser sensors 43, a communication unit 44, a storage unit 45, a GPS receiving unit 46, and the like that are connected to the control unit 33.

As shown in FIG. 4, the body part 21 includes a housing that constitutes the exterior of the cleaning robot 20, and a support frame, a chassis, and the like that are provided inside the housing. The traveling part 22 is provided in a lower portion of the body part 21. The traveling part 22 is a part for transmitting a conveyance force acting in an advancing direction to the floor surface while maintaining the travelling orientation of the cleaning robot 20, and includes a pair of traveling wheels 221 and four casters 222. An output shaft of the motor 23 is coupled to the respective rotating shafts of the pair of wheels 221 via a transmission mechanism such as a deceleration gear. Accordingly, when the motor 23 is driven by the control unit 33, and the rotary drive force of the motor 23 is output from the output shaft, the rotary drive force of the motor 23 is transmitted to the wheels 221 and the cleaning robot 20 travels in a direction that corresponds to the rotation direction of the motor 23.

The air intake unit 25 includes a plurality of air intake fans 251. When the air intake fans 251 are driven, air suctioned from the air intake nozzle 28 is passed through a flexible hose 34, the interior of the air intake unit 25, and an air exhaust tube (not shown), and is discharged to the outside.

The battery 24 is provided in the central portion of the body part 21. The battery 24 supplies drive power to the motor 23 and the air intake fans 251.

FIG. 4 is a diagram illustrating a perspective view of an outer appearance on the rear side of the cleaning robot 20. As shown in FIGS. 3 and 4, the collection box 26 is provided on the rear face of the body part 21. The rear face of the body part 21 is provided with the support holder 27 that covers the rear face and supports the collection box 26 so that it can be detached therefrom. In the center of the support holder 27 in the left-right direction D3 (width direction), a recess 271 is formed extending in the up-down direction D1, and the collection box 26 is fitted into the recess 271 so as to be detachable therefrom.

Also, as shown in FIG. 4, the air intake nozzle 28 is provided in a lower portion of the support holder 27. The air intake nozzle 28 is provided with a pair of rotating brushes 36 (36A, 36B) that are attached so as to be rotatable. The rotating brushes 36 rotate as a result of rotary drive force being transmitted from the motor (not shown). When the motor is driven by the control unit 33 during the travel of the cleaning robot 20, the rotating brushes 36 are rotated, and waste on the floor surface is properly collected.

The operation unit 30 is provided in an upper portion on the rear face of the body part 21. The operation unit 30 is a device operated by an operator and is, for example, a terminal device having a touch panel on which touch operation is possible. The various kinds of cleaning information (information such as a travel route, a cleaning area map, a cleaning time zone, and a return position) to be registered in the cleaning robot 20 can be input from the operation unit 30. The input cleaning information is transferred to and stored in the RAM or the storage device (not shown) of the control unit 33, and is used in travel control performed by the control unit 33.

As shown in FIG. 4, the charging connection part 32 is provided on the rear face of the cleaning robot 20. The charging connection part 32 is used when the battery 24 is charged, and is to be coupled to the charge support vehicle 50 or the charging station (not shown) for the cleaning robot 20 at the time of charging. In the present embodiment, the charging connection part 32 is provided on a rear face 27A of the support holder 27. The charging connection part 32 is provided to the right of the recess 271 formed in the rear face 27A (on the left side when viewed from the rear face 27A). A recess 272 is formed in the rear face 27A of the support holder 27, and the charging connection part 32 is provided in the recess 272.

The charging connection part 32 includes three power-receiving terminals 321 to be connected to three power-feeding terminals 531 of the charge support vehicle 50. The three power-receiving terminals 321 are so-called contact terminals, and are vertically aligned along the up-down direction D1.

As shown in FIG. 2, the front laser sensor 41 and the sonar sensors 42 are provided on the front face of the cleaning robot 20.

The front laser sensor 41 is a sensor that is used to detect whether there is an obstacle in front of the cleaning robot 20 while the cleaning robot 20 travels forward. The front laser sensor 41 is provided in a groove 275 that is formed in the lower portion of the body part 21 and extends in the width direction. The front laser sensor 41 is arranged in the center in the interior of the groove 275. The front laser sensor 41 is a two-dimensional scanning sensor that measures the distance to a detection target while performing scanning in the horizontal direction by emitting laser light forward, and is also referred to as a side range sensor or a laser range scanner. Two-dimensional data of a forward area in the horizontal direction is obtained by the front laser sensor 41. The front laser sensor 41 includes a laser oscillation element, a laser driver for driving the laser oscillation element, a light receiving element, a light receiving processing circuit for converting an output of the light receiving element into a digital signal, and the like.

The front laser sensor 41 is connected to the control unit 33, and is controlled by the control unit 33. The front laser sensor 41 emits pulsed laser light forward in the width direction (horizontal direction) in a range of a predetermined scan angle. In one example, the scan angle may be a given angle, e. g., 120 degrees. When the front laser sensor 41 receives a wave pulse that has returned after reflection from a detection target within a measurement area, the control unit 33 measures a period of time until the return of the wave pulse, and calculates the distance to the object at each scan position based on the measured value. Accordingly, the control unit 33 can recognize the distance and position to an object present in front of the cleaning robot 20 (in an advancing direction), and the shape and size of the object in the width direction.

The sonar sensors 42 are provided below the display panel 31. The sonar sensors 42 are provided on the front face of the body part 21 at two ends in the width direction, respectively. The sonar sensors 42 are connected to the control unit 33, and are controlled by the control unit 33. The sonar sensors 42 are configured to use a sound wave to detect whether there is an object, and measures the distance to an object based on a period of time for which the sound wave returns after reflection from the object.

As shown in FIG. 2, the side laser sensors 43 are respectively provided on two side faces of the body part 21. In other words, the body part 21 includes one pair of side laser sensors 43. Each of the side laser sensors 43 functions as a distance detection device that measures the distance to a target object located on the rear, and functions as a two-dimensional data detection device that obtains two-dimensional data of a measurement area that includes the front side, lower side, and rear side of the cleaning robot 20. Each of the side laser sensors 43 measures the distance to the target object located on the rear by emitting laser light rearward of the cleaning robot 20. Also, by performing scanning with laser light emitted toward the measurement area that includes the front side, lower side, and rear side of the cleaning robot 20, each of the side laser sensors 43 obtains two-dimensional data of the measurement area.

The side laser sensors 43 have substantially the same configuration as that of the front laser sensor 41, and each include a laser oscillation element, a laser driver for driving the laser oscillation element, a light receiving element, a light receiving processing circuit for converting an output of the light receiving element into a digital signal, and the like. The side laser sensors 43 are connected to the control unit 33, and are controlled by the control unit 33.

The communication unit 44 wirelessly connects the cleaning robot 20 to the communication network N1, and executes data communication with the management server 10 and the charge support vehicle 50 via the communication network N1 in accordance with a predetermined communication protocol.

The storage unit 45 is a nonvolatile storage medium or storage device such as a flash memory that stores various kinds of information. For example, the storage unit 45 stores one or more control programs for causing the control unit 33 to execute various types of processing required for later-described charging requesting processing (see FIG. 8) that is executed by the cleaning robot 20.

The GPS receiving unit 46 is a receiving antenna for receiving positional information transmitted from the GPS. The GPS receiving unit 46 receives the current position of the cleaning robot 20 that is traveling. The received positional information is used in various types of processing executed by the control unit 33.

The control unit 33 is provided in the upper portion of the body part 21. The control unit 33 controls operations of the constituent components of the cleaning robot 20, and specifically controls, for example, the forward and rearward travel and rotation of the cleaning robot 20, the return to the charging station (not shown) for the cleaning robot 20, the driving of the air intake fans 251 of the air intake unit 25, the screen display of the display panel 31, and the like. The control unit 33 includes control instruments such as, for example, a CPU, a ROM, and a RAM.

The CPU is a processor that executes various types of arithmetic processing. The ROM is a nonvolatile memory in which control programs such as a BIOS and an OS for causing the CPU to execute various types of processing are stored in advance. The RAM is a volatile or nonvolatile memory that stores various kinds of information, and is used as a temporary storage memory (work area) for various types of processing executed by the CPU. As a result of the CPU executing various types of control programs stored in advance in the ROM or the storage unit 45, the control unit 33 executes the later-described charging requesting processing (see FIG. 8), and also controls the travel and rotation of the cleaning robot 20, the return to the charging station, the driving of the air intake fans 251, the screen display of the display panel 31, and the like.

Figure 7:
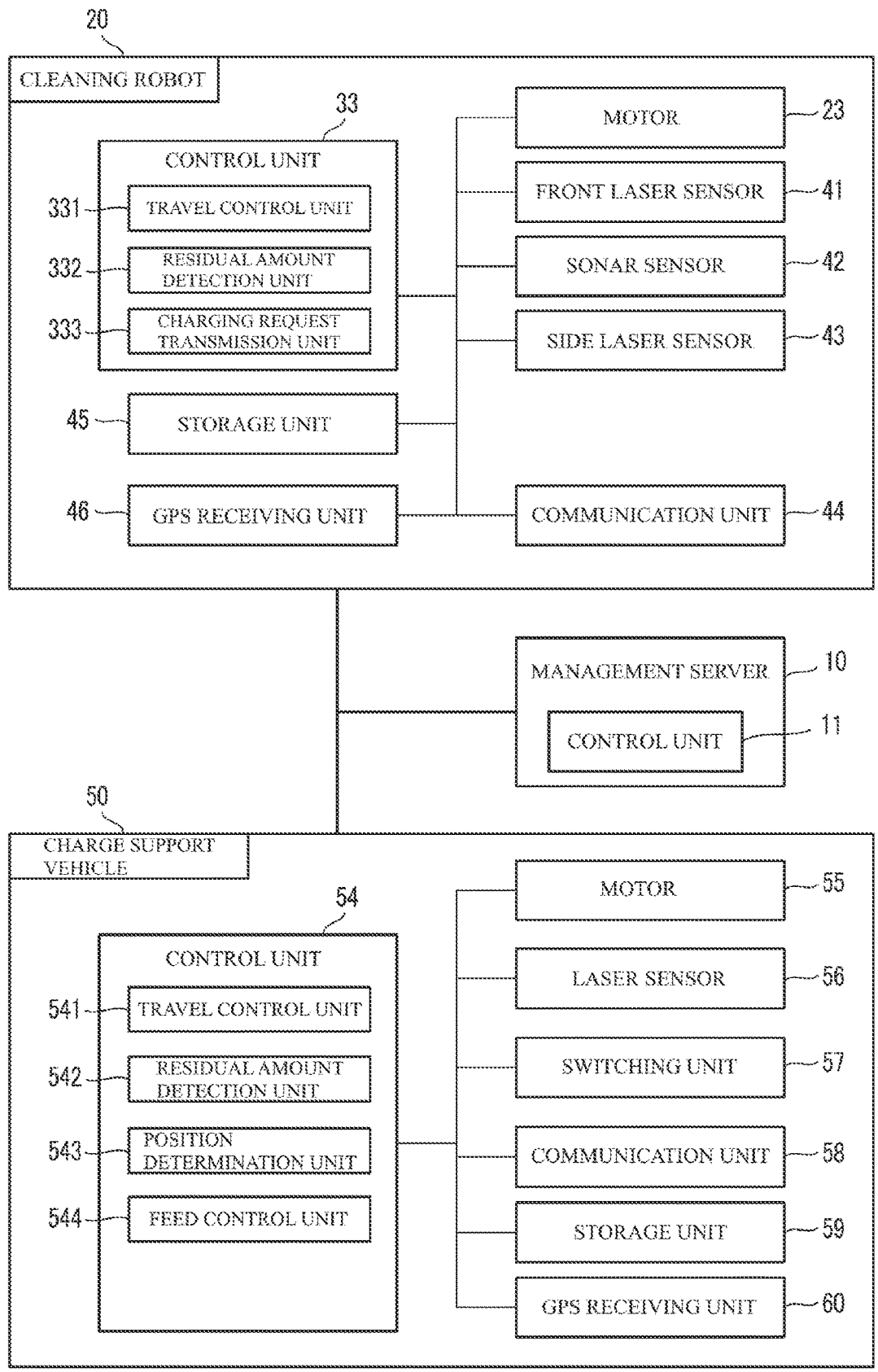
FIG. 7 is a block diagram illustrating a configuration of a charging system according to one or more embodiments.

FIG. 7 is a diagram illustrating a configuration of the control unit 33. As shown in FIG. 7, the control unit 33 includes various types of processing units such as a travel control unit 331, a residual amount detection unit 332, and a charging request transmission unit 333. As the result of the CPU executing various types of arithmetic processing in accordance with the control programs, the control unit 33 functions as the various types of processing units. The control unit 33 or the CPU is an example of a processor that executes the control programs. Note that some or all of the processing units included in the control unit 33 may also be constituted by an electronic circuit. Also, the control programs may also be programs for causing a plurality of processors to function as the various types of processing units.

The travel control unit 331 controls the travel of the cleaning robot 20 based on various kinds of cleaning information (information such as a travel route, a cleaning area map, a cleaning time zone, and a return position) registered in the cleaning robot 20. In other words, by controlling the driving of the motor 23, the travel control unit 331 controls the forward travel, the rearward travel, the rotation, and the like of the cleaning robot 20.

The residual amount detection unit 332 measures the residual amount of the battery 24 by measuring the energy capacity remaining in the battery 24. For example, the residual amount detection unit 332 measures a terminal voltage of a battery cell of the battery 24 based on a well-known voltage measurement method, and obtains the residual amount thereof. The method for measuring the residual amount is of course not limited to above-described voltage measurement method. The measured residual amount is used in various types of processing executed by the control unit 33.

When the residual amount measured by the residual amount detection unit 332 is less than a predetermined lower limit reference value (threshold), the charging request transmission unit 333 determines that the residual amount of the battery is low, and transmits a charging request (an example of a battery feed request) to the management server 10. The charging request transmission unit 333 also transmits, together with the charging request, positional information indicating the current position of the cleaning robot 20 to the management server 10. Upon receiving the charging request and the positional information, the management server 10 transfers the charging request and the positional information to the charge support vehicle 50. In other words, the charging request transmission unit 333 transmits the charging request and the positional information to the charge support vehicle 50 via the management server 10. Note that the charging request transmission unit 333 may also directly transmit the charging request and the positional information to the charge support vehicle 50.

Charge Support Vehicle 50

Figure 5:
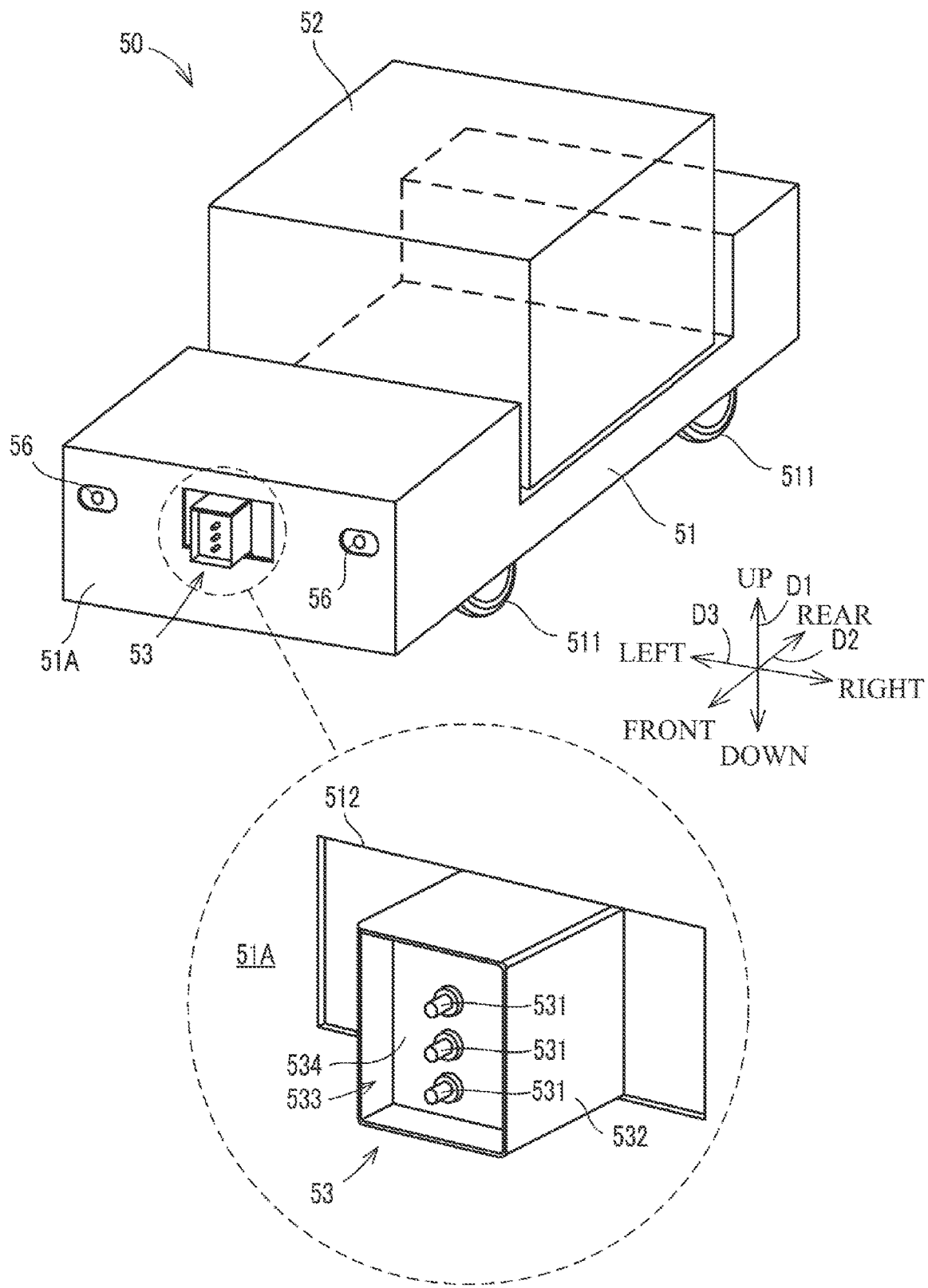
FIG. 5 is a diagram illustrating a perspective view of an outer appearance on a front side of a charge support vehicle according to one or more embodiments.
Figure 6:
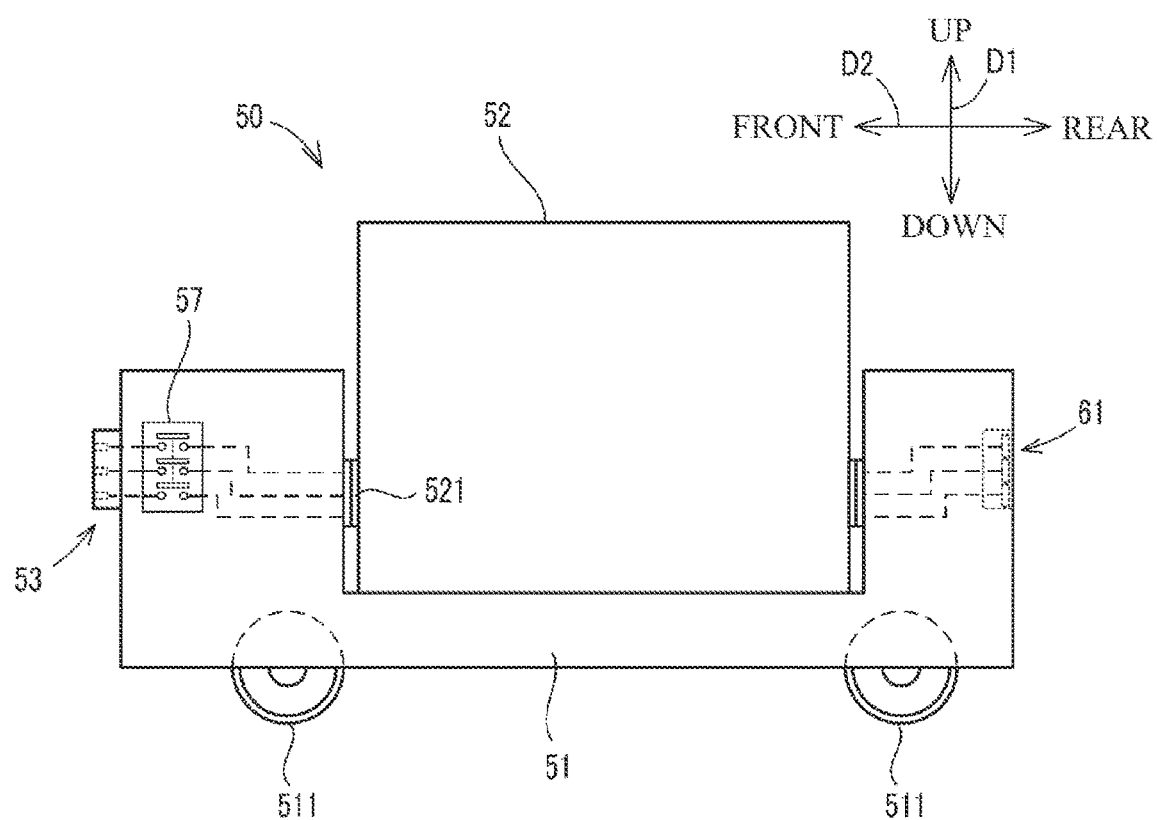
FIG. 6 is a diagram illustrating a side view of a charge support vehicle according to one or more embodiments.

FIG. 5 is a diagram illustrating a perspective view of an outer appearance on the front side of the autonomous travel-type charge support vehicle 50 according to the embodiment, and FIG. 6 is a diagram illustrating a side view of the charge support vehicle 50. FIG. 7 also shows a configuration of the charge support vehicle 50.

In one or more embodiments, when a battery feed request to feed the battery of the cleaning robot 20 that is traveling is received, the charge support vehicle 50 is configured to: start traveling from, for example, a predetermined standby station (not shown) while searching for the cleaning robot 20; approach, when the cleaning robot 20 is found, the cleaning robot 20 to a feeding position in which power feeding is possible from the battery 52 installed in the charge support vehicle 50 to the battery 24 of the cleaning robot 20, while traveling so as to keep the position; and feed power from the battery 52 to the battery 24.

Specifically, as shown in FIG. 5, the charge support vehicle 50 includes a vehicle body 51 (an example of a vehicle body), a power-feeding battery 52 (an example of a power-feeding battery), a power-feeding connection part 53 (an example of a power-feeding connection part), a charging connection part 61, and a control unit 54 (see FIG. 7). As shown in FIG. 7, the charge support vehicle 50 also includes a motor 55 connected to the control unit 54, laser sensors 56 (an example of a distance detection unit), a switching unit 57, a communication unit 58, a storage unit 59, a GPS receiving unit 60, and the like.

The vehicle body 51 is provided with four wheels 511 for traveling. An output shaft of the motor 55 is coupled to the respective rotating shafts of the four wheels 511 via a transmission mechanism such as a deceleration gear. Accordingly, when the motor 55 is driven by the control unit 54, and the rotary drive force of the motor 55 is output from the output shaft, the rotary drive force of the motor 55 is transmitted to the wheels 511 and the charge support vehicle 50 travels in a direction that corresponds to the rotation direction of the motor 55.

The vehicle body 51 includes the battery 52. The battery 52 is provided in the vicinity of the center of the vehicle body 51 in the front-rear direction D2. The battery 52 is a high-capacity battery whose capacity is substantially larger than the capacity of the battery 24 of the cleaning robot 20, and stores electric power for charging the battery 24 of the cleaning robot 20, and for driving the motor 55 (see FIG. 7) that drives the charge support vehicle 50.

The power-feeding connection part 53 is provided on a front face 51A of the vehicle body 51. The power-feeding connection part 53 protrudes to the outside of the front face 51A from the interior of the vehicle body 51 via an opening 512. The power-feeding connection part 53 is supported in the interior of the vehicle body 51 so as to be slidable in the width direction of the front face 51A.

The power-feeding connection part 53 includes the power-feeding terminals 531 for power feeding that are connected to the power-receiving terminals 321 (see FIG. 3) of the charging connection part 32 of the cleaning robot 20. The three power-receiving terminals 321 are so-called contact terminals. In the present embodiment, the power-feeding connection part 53 includes three power-feeding terminals 531 that correspond to the three power-receiving terminals 321 in a one-on-one basis.

The power-feeding connection part 53 includes a holding part 532 for holding the power-feeding terminals 531. The holding part 532 has a cuboid shape elongated in the front-rear direction D2, and protrudes outward from the opening 512. A recess 533 having a bottom 534 is formed in an end (protruding end) of the holding part 532 in the protruding direction. The three power-feeding terminals 531 are provided on the bottom 534 so as to protrude outward (forward) from the bottom 534 perpendicularly. On the bottom 534, the three power-feeding terminals 531 are vertically aligned along the up-down direction D1. Also, the protruding length of the power-feeding terminals 531 is defined such that the power-feeding terminals 531 do not protrude outward from the recess 533.

In the present embodiment, the power-feeding connection part 53 is located at the same height as the height at which the charging connection part 32 of the cleaning robot 20 is located. Accordingly, when the charge support vehicle 50 is docked to the cleaning robot 20, the power-feeding terminals 531 of the power-feeding connection part 53 can be respectively connected to the power-receiving terminals 321 of the charging connection part 32.

The laser sensors 56 are provided on the front face 51A of the vehicle body 51. The laser sensors 56 are sensors that are used to detect, when it travels, the cleaning robot 20 that is traveling in front of the charge support vehicle 50. The laser sensors 56 are two-dimensional scanning sensors that have the same configuration as that of the front laser sensor 41, and measure the distance to a detection target while performing scanning in the horizontal direction by emitting laser light, which is measurement light, forward. With the laser sensors 56, the distance to a target object located in front of the charge support vehicle 50, and two-dimensional data in the horizontal direction are obtained as a result of the detection. The laser sensors 56 are connected to the control unit 54, and are controlled by the control unit 54. When the laser sensors 56 receive a wave pulse that has returned after reflection from a detection target in a measurement area, the control unit 54 measures a period of time until the return of the wave pulse, and calculates the distance to the target object at each scan position based on the measured value. Accordingly, the control unit 54 can recognize the distance and position to an object present in front of the charge support vehicle 50 (in an advancing direction), and can determine whether the object is the cleaning robot 20 on the basis of the width-directional shape and size of the object.

As shown in FIG. 6, the charging connection part 61 is provided on a rear face 5113 of the vehicle body 51. The charging connection part 61 is used when the battery 52 is charged, and is to be coupled to a charging station (not shown) for the charge support vehicle 50. The charging connection part 61 has the same configuration as that of the charging connection part 32 of the cleaning robot 20, and includes three power-receiving terminals to be connected to three power-feeding terminals of the charging station for the charge support vehicle 50.

The switching unit 57 is provided inside the vehicle body 51. The switching unit 57 is provided on wires that connect a contact terminal 521 of the battery 52 and the power-feeding connection part 53. When a driving signal is input from the drive signal control unit 54, the switching unit 57 is activated and brings a charging path constituted by the wires into a conductive state, and when the driving signal is turned off, the switching unit 57 interrupts the charging path.

The communication unit 58 wirelessly connects the charge support vehicle 50 to the communication network N1 and executes data communication with the management server 10 and the cleaning robot 20 via the communication network N1 in accordance with a predetermined communication protocol.

The storage unit 59 is a nonvolatile storage medium or storage device such as a flash memory that stores various kinds of information. For example, the storage unit 59 stores, for example, one or more control programs for causing the control unit 54 to execute various types of processing required for the later-described tracking charging processing (see FIG. 10) and the like. For example, the control programs are recorded in a computer-readable recording medium or a storage device such as a cloud storage in a non-transitory manner, are read from the storage device, and are stored in the storage unit 59.

Also, the storage unit 59 stores tracking information for use in, for example, the tracking charging processing (see FIG. 10) that is executed in the charge support vehicle 50, positional information relating to a standby position of the charge support vehicle 50, and other various kinds of information. The standby position is a position of the charging station for the charge support vehicle 50. The tracking information is an example of position specifying information, and may refer to information necessary for tracking the cleaning robot 20 that is traveling in the facility. For example, the tracking information includes a travel route and a cleaning area map that are registered in the cleaning robot 20 as information essential for traveling during cleaning, and further includes GPS-based positional information of the cleaning robot 20 that is input to the charge support vehicle 50 when necessary, and the like. Note that the tracking information may include all of the travel route, the cleaning area map, and the positional information, or may include any one or more thereof.

The GPS receiving unit 60 is a receiving antenna for receiving GPS-based positional information. The GPS receiving unit 60 receives the current position of the charge support vehicle 50 that is traveling. The received positional information is used in various types of processing executed by the control unit 54.

The control unit 54 controls the operations of the constituent components of the charge support vehicle 50, and specifically controls, for example, the forward and rearward travel and rotation of the charge support vehicle 50, the start from the charging station (not shown) for the charge support vehicle 50, the return to a charging station, and the like. The control unit 54 includes control instruments such as, for example, a CPU, a ROM, and a RAM.

The CPU is a processor that executes various types of arithmetic processing. The ROM is a nonvolatile memory in which control programs such as a BIOS and an OS for causing the CPU to execute various types of processing are stored in advance. The RAM is a volatile or nonvolatile memory that stores various kinds of information, and is used as a temporary storage memory (work area) for the various types of processing executed by the CPU. As a result of the CPU executing the various types of control programs stored in advance in the ROM or the storage unit 59, the control unit 54 executes the later-described tracking charging processing (see FIG. 10), and also controls the travel and rotation of the charge support vehicle 50, the start from the charging station for the charge support vehicle 50, the return to a charging station, and the like.

FIG. 7 shows a configuration of the control unit 54. As shown in FIG. 7, the control unit 54 includes various types of processing units such as a travel control unit 541, a residual amount detection unit 542, a position determination unit 543, and a feed control unit 544. The travel control unit 541 is an example of a first control unit and a second control unit. Also, the feed control unit 544 is an example of a third control unit. As a result of the CPU executing various types of arithmetic processing in accordance with the control program, the control unit 54 functions as the various types of processing units. The control unit 54 or the CPU is an example of a processor that executes the control programs. Note that a description is given assuming that the travel control unit 541 is an example of the first control unit and the second control unit, but travel control that corresponds to the first control unit, and travel control that corresponds to the second control unit may be realized by separate processing units. Also, some or all of the processing units included in the control unit 54 may also be constituted by an electronic circuit. Also, the control programs may also be programs for causing a plurality of processors to function as the various types of processing units.

The travel control unit 541 serving as the first control unit executes control (tracking travel control) for tracking the cleaning robot 20 that is traveling and performing cleaning operation in a facility, based on the tracking information stored in the storage unit 59.

For example, upon receiving positional information of the cleaning robot 20 transmitted by the charging request transmission unit 333, the travel control unit 541 tracks the cleaning robot 20 based on the positional information. Specifically, the travel control unit 541 references the travel route to calculate the shortest route, on the travel route, from the standby position of the charge support vehicle 50 to the position specified by the positional information, and controls the charge support vehicle 50 to travel along the shortest route. Note that if information relating to the advancing direction (traveling direction) of the cleaning robot 20 is received, the travel control unit 541 will calculate the shortest route based on not only the positional information but also the advancing direction.

Also, if positional information is transmitted continuously from the charging request transmission unit 333, the travel control unit 541 will control the charge support vehicle 50 to travel toward the position indicated by the previously received positional information.

Also, when the travel control unit 541 captures the cleaning robot 20 based on the two-dimensional data of the laser sensors 56 while the charge support vehicle 50 travels under tracking travel control, the travel control unit 541 switches the tracking travel control to follow-up travel control. In follow-up travel control, the travel control unit 541 controls the travel of the charge support vehicle 50 so that the charge support vehicle 50 follows up (catches up with) the cleaning robot 20 based on the distance and position measured by the laser sensors 56.

Also, when charging of the cleaning robot 20 is complete, the travel control unit 541 controls the travel of the charge support vehicle 50 (return travel control) so that the charge support vehicle 50 returns to the standby position based on the positional information of the standby position in which the charge support vehicle 50 was located before the start of the travel. Note that when the charge support vehicle 50 returns to the standby position, the charge support vehicle 50 is connected to the charging station, and the battery 52 is charged.

It should be noted that in at least the present embodiment, travel control is exemplified in which the positional information of the cleaning robot 20 is obtained, and the cleaning robot 20 is tracked based on the positional information, but the travel control by the travel control unit 541 is not limited to the above-described example. For example, in a case where there is no positional information, the travel control unit 541 may also control the charge support vehicle 50 to travel along the travel route while performing forward scanning using the laser sensors 56. If the cleaning robot 20 is captured during the travel, the travel control unit 541 will perform the follow-up travel control.

The residual amount detection unit 542 measures the residual amount of the battery 52 by measuring the energy capacity remaining in the battery 52. The measured residual amount is used in various types of processing executed by the control unit 54.

The position determination unit 543 determines whether the charge support vehicle 50 is located in a chargeable position (an example of a feeding position) based on the distance measured by the laser sensor 56. Here, the chargeable position refers to a position in which power feeding is possible from the power-feeding battery 52 to the battery 24 of the cleaning robot 20, specifically, a position in which the power-feeding connection part 53 (see FIG. 5) of the charge support vehicle 50 can be connected to the charging connection part 32 (FIG. 4) of the cleaning robot 20 so as to be able to feed power. The information indicating the distance and positional relationship between the charge support vehicle 50 and the cleaning robot 20 in the chargeable position is stored in advance in the storage unit 59 of the charge support vehicle 50, and the position determination unit 543 also uses the information to determine whether the charge support vehicle 50 is located in the chargeable position.

In the present embodiment, if it is determined by the position determination unit 543 that the charge support vehicle 50 is located in the chargeable position, the travel control unit 541, which serves as the first control unit, controls the charge support vehicle 50 to travel while maintaining the chargeable position. For example, the travel control unit 541 synchronizes the speed of the charge support vehicle 50 with the traveling speed of the cleaning robot 20 while following up the cleaning robot 20, and controls the travel of the charge support vehicle 50 (synchronized travel control).

During the synchronized travel control, the feed control unit 544 starts feeding the battery 24 of the cleaning robot 20 from the power-feeding battery 52 in the chargeable position. Specifically, the feed control unit 544 inputs a driving signal to the switching unit 57 to turn on the contacts of the switching unit 57, and thereby brings the charging path into the conductive state. Accordingly, the electric power supplied from the power-feeding connection part 53 to the charging connection part 32 (FIG. 4) is fed to the battery 24, and the battery 24 is charged.

Charging Requesting Processing

Figure 8:
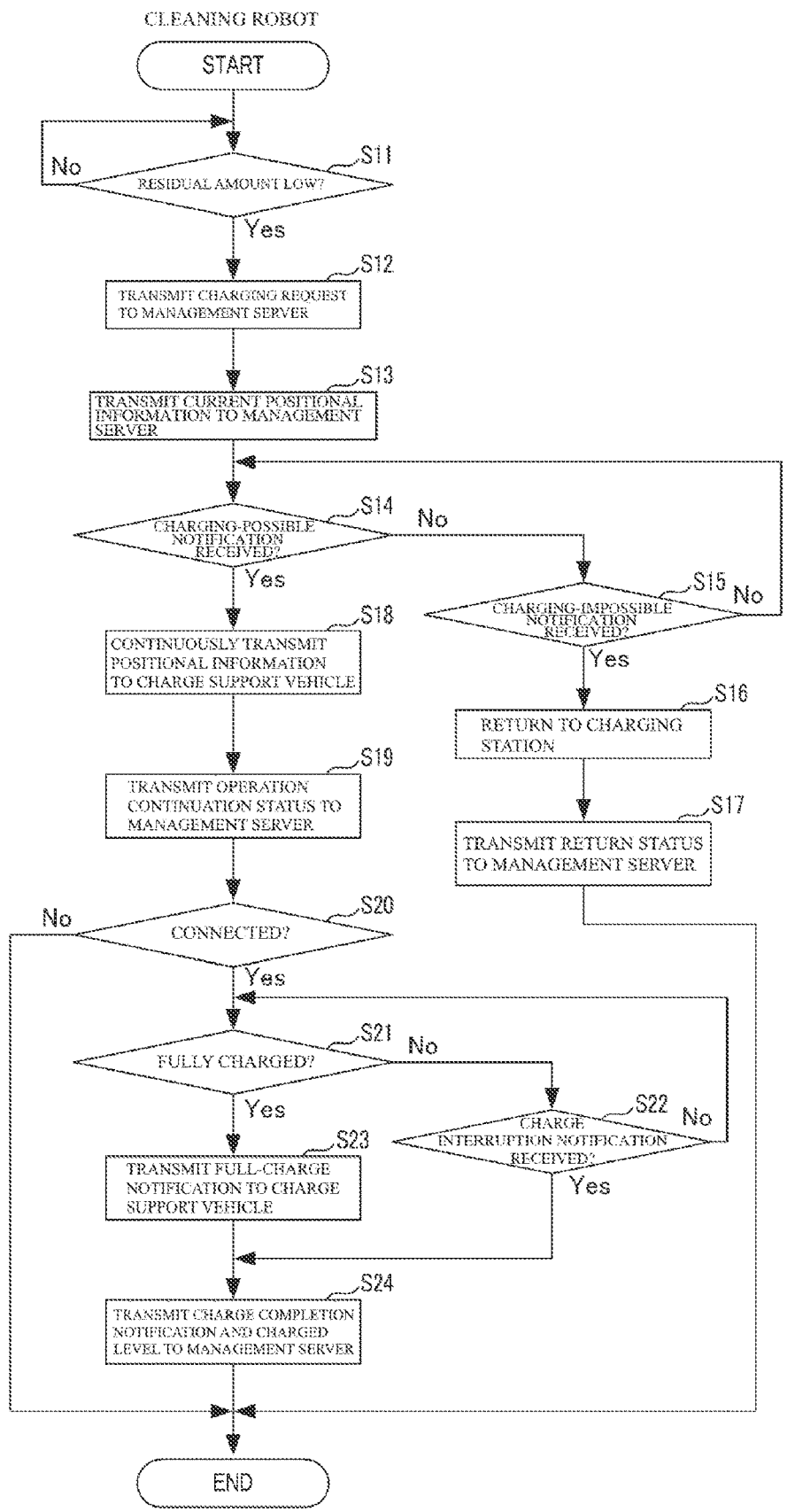
FIG. 8 is a flowchart illustrating an example of a procedure of charging request processing executed by a control unit of a cleaning robot according to one or more embodiments.

The following will describe an example of a procedure of charging requesting processing executed by the control unit 33 of the cleaning robot 20 with reference to the flowchart of FIG. 8. The charging requesting processing is started by the control unit 33 executing the control program stored in the storage unit 45. Note that one or more steps included in the charging requesting processing may be omitted as appropriate. Also, the steps of the charging requesting processing may be executed in a different order as long as the same functional effects can be achieved.

Also, the following description is given assuming that the cleaning robot 20 is cleaning (traveling) in a facility.

In step S11, the control unit 33 determines whether the residual amount (amount of stored power) of the battery 24 of the cleaning robot 20 is less than a lower limit reference value. If it is determined in step S11 that the residual amount is less than the lower limit reference value, the control unit 33 determines that the residual amount of the battery 24 is low, and transmits a charging request to the management server 10 (step S12). Also, the control unit 33 transmits GPS-based positional information of the cleaning robot 20 to the management server 10 (step S13). Note that at this time, the control unit 33 may also transmit the advancing direction of the cleaning robot 20, together with the positional information.

In step S14, the control unit 33 determines whether a charging-possible notification (response notification), which indicates that charging support by the charge support vehicle 50 is possible, has been received. If it is determined in step S14 that the response notification has not been received, the control unit 33 determines, in step S15, whether a charging-impossible notification (response notification), which indicates that the charging support by the charge support vehicle 50 is impossible, has been received. Here, the charging-possible notification and the charging-impossible notification are transmitted from the charge support vehicle 50 to the cleaning robot 20 in the later-described tracking charging processing. Note that, in step S14 or S15, the control unit 33 stands by until the charging-possible notification or the charging-impossible notification is received.

If it is determined in step S15 that the charging-impossible notification has been received, the control unit 33 controls the cleaning robot 20 to return to a predetermined charging station (step S16). As an action status of the cleaning robot 20, return status information is transmitted to the management server 10 (step S17), and the charging requesting processing is ended. Note that, upon receiving the return status information, the management server 10 registers the information into the action history of the cleaning robot 20, and manages the information.

On the other hand, if it is determined in step S14 that the response notification has been received, the control unit 33 continuously transmits, to the charge support vehicle 50, the positional information of the cleaning robot 20 during the travel (step S18). The control unit 33 transmits, as an action status of the cleaning robot 20, operation continuation status information to the management server 10 (step S19). Note that, upon receiving the operation continuation status information, the management server 10 registers the information into the action history of the cleaning robot 20, and manages the information.

In step S20, the control unit 33 determines whether the power-feeding connection part 53 is connected to the charging connection part 32. Specifically, the control unit 33 determines that the charging connection part 32 and the power-feeding connection part 53 are electrically connected to each other if the conduction between the power-receiving terminals 321 of the charging connection part 32 and the power-feeding terminals 531 of the power-feeding connection part 53 is confirmed. If, in step S20, the connection is not confirmed for a predetermined period of time and time-out occurs, the charging requesting processing is ended.

If it is determined in step S20 that the power-feeding connection part 53 is connected to the charging connection part 32, the control unit 33 determines whether the battery 24 is fully charged (step S21). If it is determined that the battery 24 is fully charged, the control unit 33 transmits a full-charge notification, which indicates that the battery 24 is fully charged, to the charge support vehicle 50 (step S23). The control unit 33 transmits a charge completion notification and a charged level indicating the amount of stored power of the battery 24 to the management server 10 (step S24), and the charging requesting processing is ended.

On the other hand, if a charge interruption notification is received before the battery 24 is fully charged (Yes in step S22), the control unit 33 transmits, in step S24, the charge completion notification and the charged level indicating the current amount of stored power of the battery 24 to the management server 10 and the charging requesting processing is ended. Here, the charge interruption notification is transmitted from the charge support vehicle 50 to the cleaning robot 20 in the later-described tracking charging processing, when the amount of stored power of the battery 52 of the charge support vehicle 50 is reduced and the charge support vehicle 50 can no longer perform charging. Note that, in step S21 or S22, the control unit 33 stands by until the full-charge notification or the charge interruption notification is received.

Relay Processing

Figure 9:
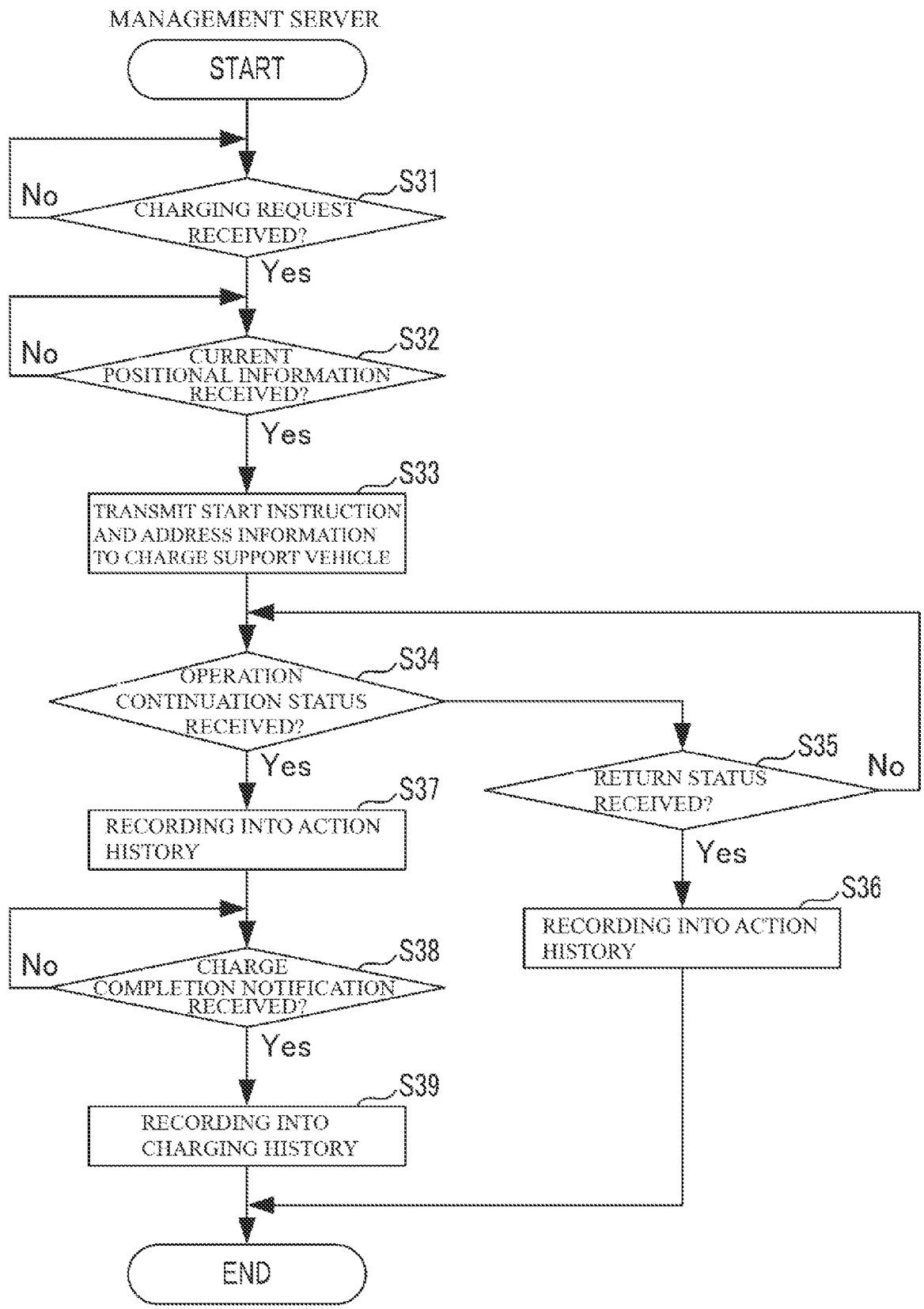
FIG. 9 is a flowchart illustrating an example of a procedure of relay processing executed by a control unit of a server device. according to one or more embodiments

The following is a description of an example of a procedure of relay processing executed by the control unit 11 of the management server 10 with reference to the flowchart of FIG. 9. The relay processing is started by the control unit 11 executing a predetermined control program. Note that one or more steps included in the relay processing may be omitted as appropriate. Also, the steps of the relay processing may be executed in a different order as long as the same functional effects can be achieved.

In step S31, the control unit 11 determines whether the charging request transmitted from the cleaning robot 20 has been received. If it is determined that the charging request has been received, the control unit 11 determines, in step S32, whether the positional information transmitted from the cleaning robot 20 has been received. If it is determined that the charging request and the positional information have been received, the control unit 11 transmits, in step S33, a start instruction for instructing the charge support vehicle 50 to start tracking the cleaning robot 20, and address information of the cleaning robot 20, to the charge support vehicle 50. The address information is information with which the cleaning robot 20 connected to the communication network N1 can be identified. Note that upon receiving the start instruction, the charge support vehicle 50 executes the later-described tracking charging processing.

In step S34 following the transmission processing in step S33, the control unit 11 determines whether the operation continuation status information has been received from the cleaning robot 20. If it is determined in step S34 that the operation continuation status information has not been received, the control unit 11 determines, in step S35, whether the return status information has been received.

If it is determined in step S34 that the operation continuation status information has been received, the control unit 11 records the information in the action history of the cleaning robot 20 registered and managed in the storage device of the management server 10 (step S37). The control unit 11 determines whether the charge completion notification transmitted from the cleaning robot 20 has been received (step S38). If it is determined that the charge completion notification has been received, the control unit 11 records the charge completion information in the charging history including the cumulative number of charging, time and date of the completion of charging, the charged level, and the like (step S39) and the relay processing is ended.

If it is determined in step S35 that the return status information has been received, the control unit 11 records the information in the action history registered and managed in the storage device of the management server 10 (step S36) and the relay processing is ended.

Tracking Charging Processing

Figure 10:
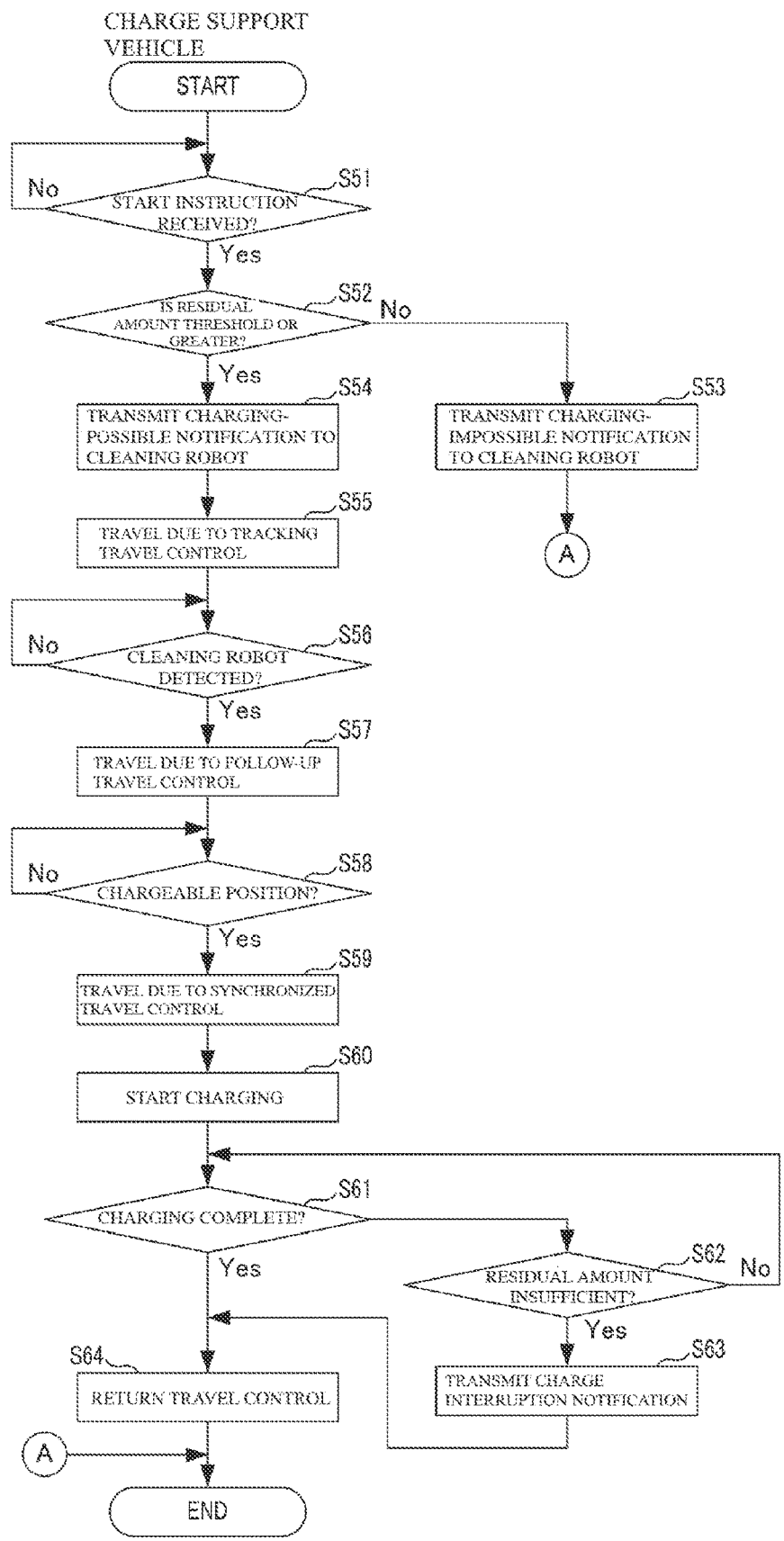
FIG. 10 is a flowchart illustrating an example of a procedure of tracking charging processing executed by a control unit of a charge support vehicle according to one or more embodiments.

The following is a description of an example of a procedure of tracking charging processing executed by the control unit 54 of the charge support vehicle 50 with reference to the flowchart of FIG. 10. The tracking charging processing is started by the control unit 54 executing the control program stored in the storage unit 59. Note that one or more steps included in the tracking charging processing may be omitted as appropriate. Also, the steps of the charging requesting processing may be executed in a different order as long as the same functional effects can be achieved.

Also, the following description is given assuming that the charge support vehicle 50 is standing by at the charging station (standby position) that charges the battery 52 of the charge support vehicle 50.

In step S51, upon receiving the start instruction and the address information of the cleaning robot 20 transmitted from the management server 10 (step S51), the control unit 54 determines whether the residual amount of the battery 52 is a predetermined threshold or greater (step S52). If it is determined that the residual amount of the battery 52 is the threshold or greater, the control unit 54 determines that the battery 52 has the amount of stored power to the extent such that the charge support vehicle 50 can make a round trip between the standby position of the charge support vehicle 50 and the position of the cleaning robot 20, and can perform a sufficient amount of charging with respect to the battery 24 of the cleaning robot 20 and the control unit 54 moves to the processing in step S54.

On the other hand, if it is determined that the residual amount of the battery 52 is less than the threshold, the control unit 54 transmits the charging-impossible notification to a destination indicated by the address information, that is, the cleaning robot 20 (step S53). Thereafter, the charge support vehicle 50 does not start traveling, and the tracking charging processing is ended.

In step S54, the control unit 54 transmits, together with the charging-possible notification, address information for identifying the charge support vehicle 50 connected to the communication network N1 to the cleaning robot 20, and executes the tracking travel control on the charge support vehicle 50 (step S55).

Figure 11:
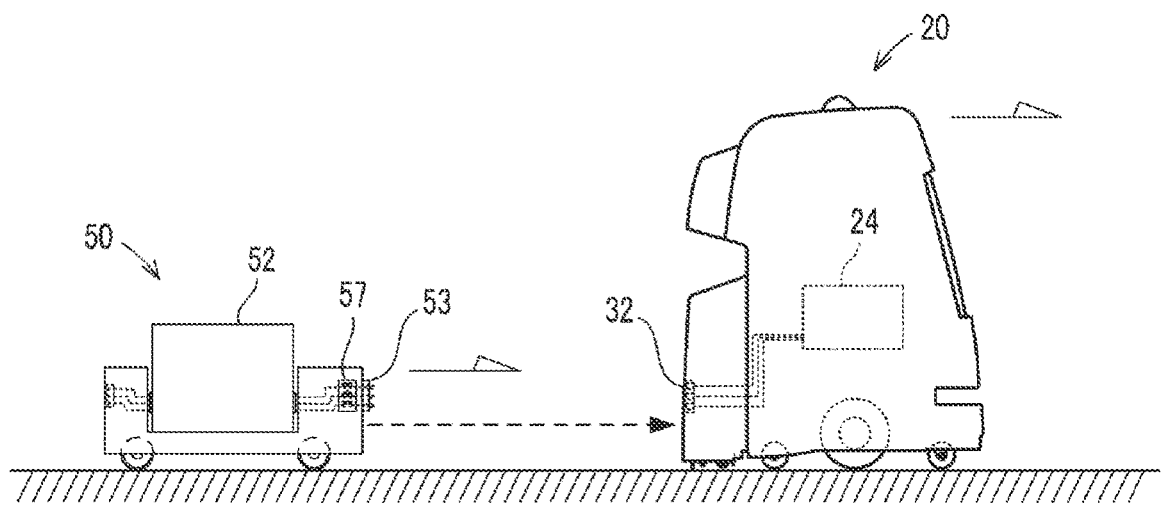
FIG. 11 is a diagram illustrating a positional relationship between a charge support vehicle and a cleaning robot.

In step S56, the control unit 54 determines whether the cleaning robot 20 has been detected based on the two-dimensional data from the laser sensors 56. As shown in FIG. 11, the cleaning robot 20 can be detected when the charge support vehicle 50 reaches a position in which laser light of the laser sensors 56 can reach the cleaning robot 20. If it is determined in step S56 that the cleaning robot 20 has been detected, the control unit 54 switches the tracking travel control executed on the charge support vehicle 50 to the follow-up travel control, and executes the follow-up travel control (step S57).

Figure 12:
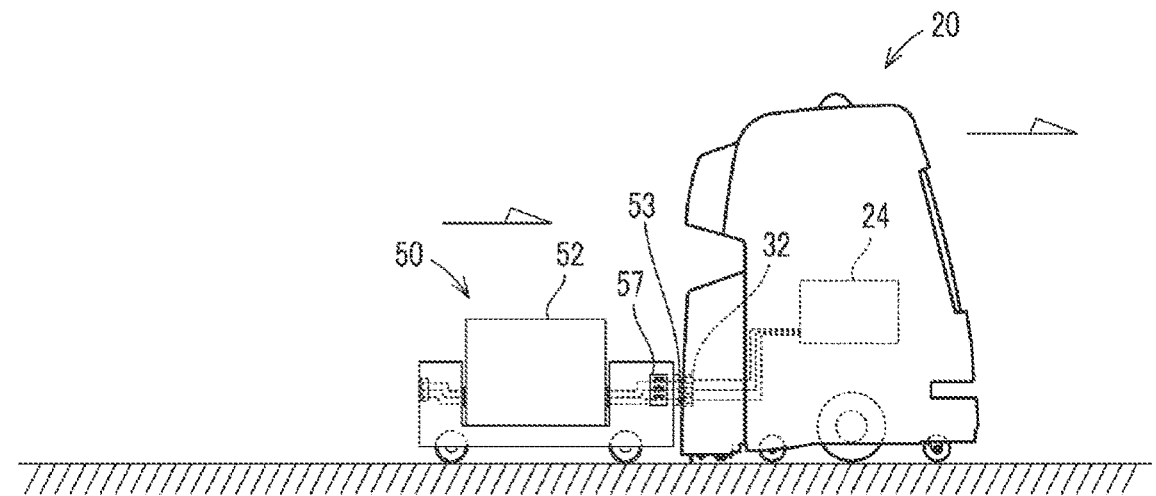
FIG. 12 is a diagram illustrating a state in which a charge support vehicle is connected to a cleaning robot.

The control unit 54 determines, in step S58, whether the charge support vehicle 50 is located in the chargeable position based on the distance measured by the laser sensor 56. Specifically, as shown in FIG. 12, the control unit 54 determines whether the charge support vehicle 50 has reached a position in which the power-feeding connection part 53 (see FIG. 5) of the charge support vehicle 50 has come into contact with the charging connection part 32 (see FIG. 4) of the cleaning robot 20. If it is determined in step S58 that the charge support vehicle 50 is located in the chargeable position, the control unit 54 switches the follow-up travel control executed on the charge support vehicle 50 to the synchronized travel control, and executes the synchronized travel control (step S59). The control unit 54 further inputs a driving signal to the switching unit 57 to turn on the contacts of the switching unit 57, and thereby starts charging the battery 24 of the cleaning robot 20 (step S60).

In step S61, the control unit 54 determines whether the charging of the battery 24 of the cleaning robot 20 is complete. For example, the control unit 54 determines that the charging is complete if the full-charge notification is received from the cleaning robot 20. When the charging of the battery 24 is complete, the control unit 54 executes the return travel control on the charge support vehicle 50 so that the charge support vehicle 50 returns to the standby position, based on the positional information of the standby position in which the charge support vehicle 50 was located before the start of the travel (step S64). The tracking charging processing is thus ended.

If it is determined in step S61 that the charging is not complete, the control unit 54 determines whether the residual amount of the battery 52 of the charge support vehicle 50 is insufficient (step S62). For example, the control unit 54 determines that the residual amount is insufficient if the residual amount of the battery 52 is reduced to a predetermined threshold. The threshold is a numerical value that corresponds to the residual amount required for the charge support vehicle 50 to return to the standby position, for example. If it is determined in step S62 that the residual amount is insufficient, the control unit 54 transmits the charge interruption notification to the cleaning robot 20 (step S63), and executes the return travel control in step S64 (step S64) and the tracking charging processing is ended.

With the above-described configurations of the charge support vehicle 50 and the charging system 100 according to the present embodiment, the charge support vehicle 50 tracks the cleaning robot 20 based on the positional information of the cleaning robot 20, and is docked to the cleaning robot 20 in a state of traveling, thereby making it possible to charge the battery 24 of the cleaning robot 20 while traveling. Therefore, the cleaning robot 20 no longer needs to interrupt the cleaning operation for every charging, and the work efficiency of the cleaning operation is improved.

Figure 13:
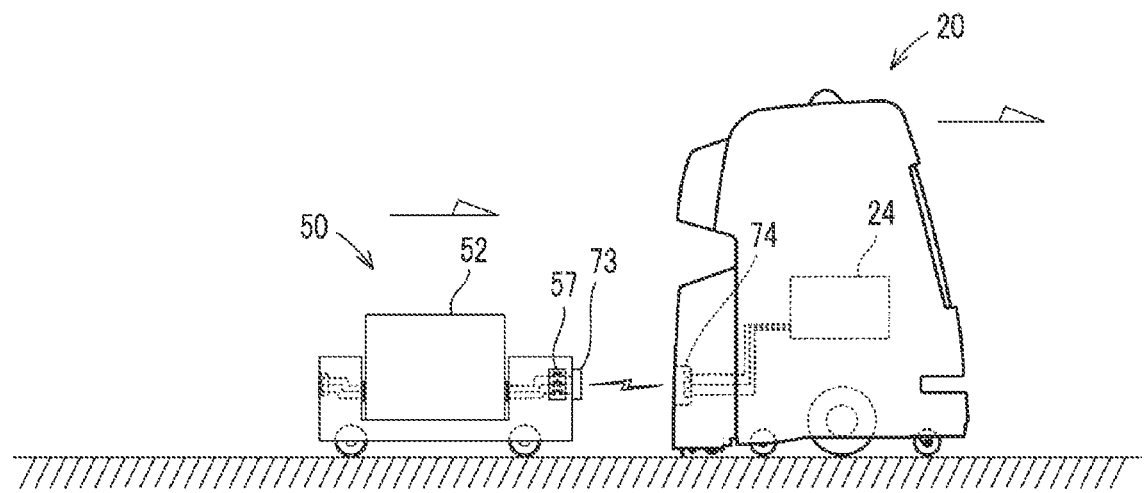
FIG. 13 is a diagram illustrating a state in which a charge support vehicle is located in a wirelessly chargeable position with respect to a cleaning robot.

It should be noted that the foregoing embodiment has described an example in which charging is started when the power-feeding connection part 53 (see FIG. 5) of the charge support vehicle 50 and the charging connection part 32 (see FIG. 4) of the cleaning robot 20 are connected to each other, one or more embodiments are not limited to such an example. For example, as shown in FIG. 13, if the charge support vehicle 50 includes a wireless power-feeding part 73 instead of the power-feeding connection part 53, and the cleaning robot 20 includes a wireless power-receiving part 74 instead of the charging connection part 32, charging may also be started when the charge support vehicle 50 reaches a position in which charging is possible from the wireless power-feeding part 73 to the wireless power-receiving part 74 by a well-known noncontact charging method.

Also, the foregoing embodiment has described an example in which the charge support vehicle 50 charges the battery 24 of the cleaning robot 20, but the charge support vehicle 50 can charge the battery of any of autonomous travel apparatuses, for example, autonomous travel-type mobile robots for realizing other usages and functions such as a security robot capable of autonomously traveling, a nursing-care robot, a delivery robot that delivers packets, and a guide robot that travels while announcing various kinds of information.

The invention claimed is:

1. A mobile charging apparatus configured to travel autonomously, and charge a battery of an electrically-powered travel object, the mobile charging apparatus comprising
a vehicle body equipped with a power-feeding battery, wherein
in response to a battery feed request to feed the battery of the electrically-powered travel object that is traveling being received, the mobile charging apparatus is configured to:
start traveling from a predetermined standby position while searching for the electrically-powered travel object;
approach, in response to the electrically-powered travel object being found, the electrically-powered travel object according to a feeding position in which power feeding is possible from the power-feeding battery to the battery of the electrically-powered travel object, and keep the vehicle body in the feeding position; and
feed power from the power-feeding battery to the battery of the electrically-powered travel object in the feeding position while the electrically-powered travel object travels.

2. The mobile charging apparatus according to claim 1, further comprising:
a first control unit configured to track the electrically-powered travel object based on position specifying information for specifying a position of the electrically-powered travel object;
a distance detection unit configured to detect a distance between the electrically-powered travel object and the vehicle body by outputting measurement light forward;
a second control unit configured to keep the vehicle body in the feeding position in response to the vehicle body being located in the feeding position based on a result of the detection by the distance detection unit; and
a third control unit configured to start feeding power from the power-feeding battery to the battery of the electrically-powered travel object in the feeding position.

3. The mobile charging apparatus according to claim 2, wherein
the second control unit controls travel of the vehicle body so that the vehicle body is kept in the feeding position while the electrically-powered travel object travels.

4. The mobile charging apparatus according to claim 2, wherein
the first control unit tracks the electrically-powered travel object based on positional information of the electrically-powered travel object that is received as the position specifying information, together with the battery feed request, from the electrically-powered travel object.

5. The mobile charging apparatus according to claim 1, wherein
the vehicle body comprises a power-feeding connection part connected to the power-feeding battery,
the electrically-powered travel object comprises a power-receiving connection part connected to the battery of the electrically-powered travel object, and
the feeding position comprises a position in which the power-feeding connection part and the power-receiving connection part are electrically connected to each other.

6. The mobile charging apparatus according to claim 1, wherein
the vehicle body comprises a wireless power-feeding part connected to the power-feeding battery,
the electrically-powered travel object comprises a wireless power-receiving part connected to the battery of the electrically-powered travel object, and
the feeding position comprises a position in which charging is possible from the wireless power-feeding part to the wireless power-receiving part by a noncontact charging method.

7. A charging system in which a battery of an electrically-powered travel object is charged from a mobile charging apparatus equipped with a power-feeding battery, the mobile charging apparatus being configured to travel autonomously, wherein
the electrically-powered travel object comprises a request transmission unit configured to transmit a battery feed request in response to a residual amount of the battery of the electrically-powered travel object being less than a predetermined threshold, and
the mobile charging apparatus comprises:
a first control unit configured to track the electrically-powered travel object based on position specifying information for specifying a position of the electrically-powered travel object;
a distance detection unit configured to detect a distance between the electrically-powered travel object and the mobile charging apparatus by outputting measurement light forward;
a second control unit configured to, in response to the mobile charging apparatus being located in a feeding position in which power feeding is possible from the power-feeding battery to the battery of the electrically-powered travel object based on a result of the detection by the distance detection unit, keep the mobile charging apparatus in the feeding position; and
a third control unit configured to start feeding power from the power-feeding battery to the battery of the electrically-powered travel object in the feeding position while the electrically-powered travel object travels.

8. The mobile charging apparatus according to claim 3, wherein
the first control unit tracks the electrically-powered travel object based on positional information of the electrically-powered travel object that is received as the position specifying information, together with the battery feed request, from the electrically-powered travel object.

9. The mobile charging apparatus according to claim 2, wherein
the vehicle body comprises a power-feeding connection part connected to the power-feeding battery,
the electrically-powered travel object comprises a power-receiving connection part connected to the battery of the electrically-powered travel object, and
the feeding position comprises a position in which the power-feeding connection part and the power-receiving connection part are electrically connected to each other.

10. The mobile charging apparatus according to claim 3, wherein the vehicle body comprises a power-feeding connection part connected to the power-feeding battery, the electrically-powered travel object comprises a power-receiving connection part connected to the battery of the electrically-powered travel object, and the feeding position comprises a position in which the power-feeding connection part and the power-receiving connection part are electrically connected to each other.

11. The mobile charging apparatus according to claim 4, wherein the vehicle body comprises a power-feeding connection part connected to the power-feeding battery, the electrically-powered travel object comprises a power-receiving connection part connected to the battery of the electrically-powered travel object, and the feeding position comprises a position in which the power-feeding connection part and the power-receiving connection part are electrically connected to each other.

12. The mobile charging apparatus according to claim 2, wherein the vehicle body comprises a wireless power-feeding part connected to the power-feeding battery, the electrically-powered travel object comprises a wireless power-receiving part connected to the battery of the electrically-powered travel object, and the feeding position comprises a position in which charging is possible from the wireless power-feeding part to the wireless power-receiving part by a noncontact charging method.

13. The mobile charging apparatus according to claim 3, wherein the vehicle body comprises a wireless power-feeding part connected to the power-feeding battery, the electrically-powered travel object comprises a wireless power-receiving part connected to the battery of the electrically-powered travel object, and the feeding position comprises a position in which charging is possible from the wireless power-feeding part to the wireless power-receiving part by a noncontact charging method.

14. The mobile charging apparatus according to claim 4, wherein the vehicle body comprises a wireless power-feeding part connected to the power-feeding battery, the electrically-powered travel object comprises a wireless power-receiving part connected to the battery of the electrically-powered travel object, and the feeding position comprises a position in which charging is possible from the wireless power-feeding part to the wireless power-receiving part by a noncontact charging method.

\* \* \* \* \*